United States Patent [19]

Murai et al.

[11] 3,925,278

[45] *Dec. 9, 1975

[54] PAINT COMPOSITIONS

[75] Inventors: Koichi Murai; Yasuo Choshi; Toshiaki Kobayashi, all of Kyoto, Japan

[73] Assignee: New Japan Chemical Company, Limited, Japan

[ * ] Notice: The portion of the term of this patent subsequent to Oct. 23, 1990, has been disclaimed.

[22] Filed: Apr. 11, 1973

[21] Appl. No.: 350,040

[30] Foreign Application Priority Data
Oct. 4, 1971    Japan.............................. 46-77632

[52] U.S. Cl................ 260/22 R; 106/187; 106/240; 106/252; 106/273; 106/279; 260/2 H; 260/28 R; 260/75 NP
[51] Int. Cl.$^2$..................... C08L 67/02; C08B 3/00
[58] Field of Search........... 260/75 NP, 75 NK, 861, 260/28 R, 22 R

[56] References Cited
UNITED STATES PATENTS

| | | | |
|---|---|---|---|
| 3,635,844 | 1/1971 | Porret et al.................. | 260/28 R X |
| 3,767,729 | 10/1973 | Murai et al........................ | 260/861 |

OTHER PUBLICATIONS

Lee and Neville, Handbook of Epoxyresins (1967), pp. 14–4,

Primary Examiner—Theodore Morris
Attorney, Agent, or Firm—McGlew and Tuttle

[57] ABSTRACT

In a paint composititon comprising a film-forming binder, an improvement characterized in that said paint composition contains a thixotropically effective amount of a condensation product of a penta- to hepta- hydric alcohol and an aromatic monoaldehyde.

14 Claims, No Drawings

PAINT COMPOSITIONS

This invention relates to an improvement in paint compositions containing a film-forming binder, more particularly to improved paint compositions containing a film-forming binder and having very high thixotropy imparted thereto and to a process for imparting thixotropy to paints.

Generally when articles are coated with a paint containing a film-forming binder, the thickness of the resulting film has close relations to the mechanical strength and resistance to water and weather. The greater the thickness, the more improved will be these properties.

However, if it is attempted to increase the thickness of the film formed by one step of coating operation, so-called running or sagging will take place to impair the appearance, whereas the viscosity of paint, when increased to prevent running or sagging, will result in difficulties in coating operation. Usually, therefore, both undercoating and overcoating are conducted repeatedly several times. It is also noted that when a paint is applied to walls and ceilings, the resulting coating is subject to running or sagging even if it is not of a large thickness. Further if the material to be coated is porous as in the case of paper, cloth, porcelain or the like, the paint applied will penetrate into the material to impair the appearance of the coated product.

As a means for overcoming the foregoing problems, paints may be rendered thixotropic. To render paints thixotropic, it is known to add thereto finely divided silica, surface active agent, hydrogenated castor oil, carboxymethyl cellulose or organic bentonite, i.e., bentonite impregnated with a cationic organic compound, for example, with a quaternary ammonium salt such as dimethyloctadecyl ammonium chloride, among which organic bentonite is the most effective to impart thixotropy. The secondly effective is finely divided silica. Inherently, bentonite per se is not soluble in water nor in organic solvents but, nevertheless, bentonite gives thixotropy since it can be readily swollen with water, whereas it hardly undergoes swelling in organic solvents since it has no affinity for oils. It is therefore practiced to add an oleophilic group to the surface of bentonite. Because of various restrictions, however, the oleophilic groups which can be practically usable are limited and employable for this purpose are only alkyl-containing substances such as quaternary ammonium salt referred to above. This consequently imposes substantial limitations on the kinds of organic solvents for swelling bentonite and therefore on the types of paints. In addition, the use of organic bentonite impairs the transparency and gloss of the paint composition obtained and lowers the stability of the same during storage. On the other hand, finely divided silica is fairly free of such great restrictions as experienced with organic bentonite, but it gives hardly any thixotropy to paints of the tar-epoxy resin type and emulsion type, because tarexpoxy resin paint are prepared by a process involving heating to dissolve tar uniformly and emulsion paints do not permit full swelling of finely divided silica. In the case of the finely divided silica, it is difficult to form a film having a satisfactory thickness inasmuch as it has lower thixotropy than organic bentonite. In addition, the use of finely divided silica reduces the transparency and gloss of the paint and is accordingly infeasible where transparency and gloss are essential.

An object of this invention is to provide improved thixotropic paint compositions free of the foregoing drawbacks and a process for imparting thixotropy to paints.

Another object of this invention is to provide paint compositions having much higher thixotropy than the thixotropic paint compositions heretofore known.

Another object of this invention is to provide highly thixotropic paint compositions which will not penetrate into porous materials.

Another object of this invention is to provide a process for imparting excellent thixotropy to various paints of whatever type and to provide thixotropic paint compositions according to the process.

Still another object of this invention is to provide a process for rendering paints highly thixotropic without impairing the transparency and gloss of the paints per se and to provide paint compositions according to the process.

These and other objects of this invention will become apparent from the following detailed description.

These objects of the present invention can be fulfilled by incorporating into a paint containing a film-forming binder a condensation product of a pentato heptahydric alcohol and an aromatic monoaldehyde in an amount effective to substantially impart thixotropy to the paint.

The present invention has been accomplished based on the novel finding that when a condensation product of a penta- to hepta-hydric alcohol and an aromatic monoaldehyde is incorporated into a paint, the resulting paint composition exhibits exceedingly higher thixotropy than the paint compositions containing organic bentonite or finely divided silica that has heretofore been known to give excellent thixotropy. Thus the present composition permits coating free of running or sagging, gives a film of an increased thickness by one step of coating, is applicable to porous materials without interior impregnation and assures greatly improved efficiency in coating operation. Furthermore, the invention has the advantage of giving excellent thixotropy to a paint of whatever type without adversely affecting the transparency and gloss of the paint per se.

The condensation product of a penta- to hepta-hydric alcohol (hereinafter referred to as a "polyhydric alcohol") and an aromatic monoaldehyde to be used according to this invention to give thixotropy to a paint is prepared by subjecting the polyhydric alcohol and aromatic monoaldehyde to usual condensation reaction. Examples of the polyhydric alcohols are xylitols, sorbitols and heptitols, of which sorbitols are preferable. Sorbitols to be used include various isomers such as D-mannitol, D-talitol, D-iditol, D-galactitol, DL-glucitol, DL-mannitol, DL-iditol, DL-galactitol, etc. Employable as heptitols are various isomers such as glyceroguroheptitol, D-glycero-D-idoheptitol, L-glycero-L-idoheptitol, D-glycero-D-garaheptitol, L-glycero-L-garaheptitol, D-glycero-D-mannoheptitol, D-glycero-D-glucoheptitol, L-glycero-L-glucoheptitol, D-glycero-L-glucoheptitol, L-glycero-D-glucoheptitol, glyceroidoheptitol, glyceroalloheptitol, D-glycero-D-altroheptitol, etc. Xylitols include various isomers such as D-xylitol, D-arabitol, D-riditol, etc.

Examples of the aromatic monoaldehydes are those having an aldehyde group substituted in the aromatic ring, such as those in which the benzene ring or naphthalene ring, with or without another substituent, has one aldehyde group. Exemplary of the substituent, other than the aldehyde group, referred to above are nitro, alkyl and amino groups and halogen atom. Specific examples of the aromatic monoaldehyde are benzaldehyde, anisaldehyde, tolualdehyde, aminobenzaldehyde, nitrobenzaldehyde, halogen-substituted benzaldehyde, iso-propylbenzaldehyde, naphthylaldehyde, nitronaphthylaldehyde, methylnaphthylaldehyde, alkyl-substituted naphthylaldehyde, etc., among which benzaldehydes such as benzaldehyde, nitrobenzaldehyde, iso-propylbenzaldehyde are particularly preferable.

The polyhydric alcohol and aromatic monoaldehyde are subjected to condensation by the conventional methods. For example, using an acid catalyst such as sulfuric acid, phosphoric acid or the like, an aqueous solution of polyhydric alcohol and aromatic monoaldehyde is subjected to dehydration condensation at a temperature of not higher than 80°C, usually about 60° to 70°C, in the presence or absence of a solvent such as cyclohexane or saturated hydrocarbon having 6 to 10 carbon atoms. By the condensation reaction between the polyhydric alcohol and aromatic monoaldehyde, two hydroxyl groups of the polyhydric alcohol condense with 1 mole of the aromatic monoaldehyde. Accordingly, if the polyhydric alcohol is xylitol, 1 mole of the polyhydric alcohol condenses with 1 mole or 2 mole of the aromatic monoaldehyde. Further when the polyhydric alcohol is sorbitol or heptitol, sorbitol or heptitol reacts with aromatic monoaldehyde to give a condensation product at the ratio of 1, 2 or 3 moles of the latter per mole of the former. According to this invention, any of these condensation products can be used effectively. They may be used singly, or at least two of them may be used in admixture. Briefly, for the condensation of polyhydric alcohol and aromatic monoaldehyde, the molar ratio therebetween may be determined in accordance with the kind of polyhydric alcohol to be used as the starting material and the kind of the condensation product desired. For instance, if the polyhydric alcohol is hexa- to hepta-hydric alcohol, the aromatic monoaldehyde may be used at the ratio of 1 to 3 moles per mole of the alcohol, whereby the reaction at the selected ratio gives a condensation product, or a mixture of products at different molar ratios will result. Further when the polyhydric alcohol is xylitol, the aromatic monoaldehyde is used at the ratio of 1 to 2 moles per mole of the alcohol to give a condensation product corresponding to the molar ratio selected.

The preferable of the condensation products of polyhydric alcohol with aromatic monoaldehyde to be used according to this invention are, for example, the condensation product of benzaldehyde with sorbitol, condensation product of iso-propylbenzaldehyde with xylitol, condensation product of naphthylaldehyde with sorbitol, condensation product of m-chlorobenzaldehyde with sorbitol and condensation product of benzaldehyde with heptitol. Among these, particularly preferable are the condensation products of sorbitol with benzaldehyde, i.e., mono-, di and tri-benzylidene sorbitols.

The paints to be used according to this invention include various paints containing film-forming binders which have been conventionally used. The binders are generally classified into resinous binders and resin-forming binders. Used for the binders of the former type are synthetic resins such as alkyd resin, unsaturated alkyd resin, modified alkyd resin, unsaturated polyester resin, phenolic resin, polyester resin, vinyl acetate resin, vinyl chloride resin, epoxy resin, acrylic resin, hydrocarbon resin, urethane resin, vinylbutyral resin, silicon resin, butyletherified aminoaldehyde resin, tar-epoxy resin, polyvinyl alcohol, etc.; and natural resins such as rosin, shellac, gum dammar, etc.; and processed natural resins such as ester gum, limed rosin, maleinized rosin, etc. The latter rosin-forming binders include drying oils such as casein oil, perilla oil, linseed oil, soybean oil, tung oil, etc.; reformed drying oils such as maleinized oil, styrenated oil, urethanated oil, etc.; cellulose derivatives such as nitrocellulose, acetylcellulose, acetylbutylcellulose, etc.; and bitumens such as asphalt, coal tar, pitch, etc. Preferably among these film-forming binders are alkyd resin unsaturated alkyd resin, modified alkyd resin, tar-epoxy resin, vinyl acetate resin, unsaturated polyester resin, epoxy resin, various drying oils, etc.

According to this invention, a thixotropically effective amount of condensation product of polyhydric alcohol with aromatic monoaldehyde is added to the paint. The thixotropically effective amount varies with the kind of paint composition and ranges from a minimum at least capable of rendering the paint composition thixotropic to a maximum that will not cause gelation. Generally, the amount is in the range of 0.001 to 10% by weight based on the weight of the binder in the paint composition. The preferable amount may be determined suitably depending on the kind of paint composition. In the case of alkyd resin paint composition or unsaturated alkyd resin composition generally containing 30 to 50% by weight of solvent, for instance, the condensation product is used in an amount of 0.005 to 0.5% by weight, most preferably about 0.01 to 0.2% by weight, based on the resin. For tar-epoxy resin paint composition, the amount is 0.3 to 10% by weight, most preferably about 1.0 to 8.0% by weight. The condensation product of polyhydric alcohol and aromatic monoaldehyde serving as a thixotropy imparting agent in this invention exhibits an excellent effect to impart thixotropy when it is dissolved or dispersed uniformly in the paint composition. Accordingly, in incorporating the condensation product to the paint, various methods capable of dissolving or dispersing the condensation product in the paint uniformly are applicable in accordance with the kind of the liquid medium contained in the paint. If the paint contains water as the liquid medium, the condensation product is previously dissolved in a water-soluble organic solvent with heating and the resulting solution is added to the paint composition at elevated temperature, whereby the condensation product will be dispersed uniformly in the water to give a uniform aqueous paint composition. Further, if the paint composition does not contain water, it is not necessarily required to previously dissolve the condensation product in solvent but the condensation product can be added to the paint composition directly. For use with a paint composition free of any solvent, the condensation product may be added directly to the composition insofar as the binder and the condensation product are miscible with each other but, otherwise, there is a need to use a solvent common to both. The most preferable method for incorporating the condensation product in the paint is as follows: The condensation product is dissolved in an organic solvent with heating and cooled to prepare a gel, which is subsequently added to and kneaded with the paint to produce the present paint composition. By this method the condensation product can be uniformly dissolved or dispersed in the paint composition containing or not containing a solvent irrespective of the kind of the solvent.

In incorporating the condensation product of polyhydric alcohol with aromatic monoaldehyde into a paint composition to render the same highly thixotropic according to this invention, finely divided silica, hydrogenated castor oil or carboxymethyl cellulose can be conjointly added. Further organic bentonite may also be used depending on the kind of solvent contained in the paint composition.

The paint compositions of this invention may contain known extender pigments such as calcium carbonate, clay, talc and the like, known pigments such as titanium white, zinc white, white lead, chrome yellow, red iron oxide, chromium oxide, Phthalocyanine Blue, carbon black and the like and various other known additives such as plasticizer, drying agent, dispersing agent, emulsifier, wetting agent, antifoaming agent, ultraviolet preventing agent, antifungal agent, rust inhibitor, flame retardant, etc.

For a better understanding of this invention examples are given below. The parts in the following examples are all by weight.

EXAMPLE 1

1 part of a 1 : 2 molar ratio mixture of sorbitol and benzaldehyde was dissolved in 5 parts of a 25 : 1 weight ratio mixture of cyclohexane and dimethylformamide, to which was added 90 wt.% sulfuric acid in an amount of 1 wt.%, based on the weight of the sorbitol. The resultant mixture was heated at 70°C for 5 hours to produce a condensation product.

To a mixture of 60 parts of unsaturated polyester resin and 70 parts of styrene was added 0.5 part of the above condensation product, and the resultant mixture was kneaded at an elevated temperature of 110°C.

EXAMPLE 2

3.0 parts of the same condensation product as Example 1 was dissolved in 65 parts of xylene at a temperature of 120°C. The resultant solution kept at 120°C was added to a mixture of 255 parts of titanium white, 367 parts of coal tar, 245 parts of "Epikote 828", 65 parts of butylglycidyl ether, 31 parts of diethylenetriamine and 31 parts of isobutanol, followed by kneading for uniform mixture.

EXAMPLE 3

440 parts of Epikote 828, 15 parts of methyl isobutyl ketone, 282 parts of xylene and 5.0 parts of the same condensation product as Example 1 were mixed together in a pot mill at room temperature for 2 hours, and 565 parts of the resultant mixture were uniformly mixed with 75 parts of hexahydrophthalic anhydride, 235 parts of titanium white and 20 parts of xylene in a pot mill at room temperature for 1 hour.

EXAMPLE 4

Heptitol and benzaldehyde were reacted in the same manner as in Example 1 to produce a condensation product. 1.2 parts of the above condensation products, 100 parts of linseed oil, 0.2 part of manganese salt of fatty acid of linseed oil were together mixed at a temperature of 100°–120°C to obtain a uniform solution. After cooling the solution, 62 parts of zinc white was added to 32 parts of the resultant mixture, and the resultant mixture was followed by full kneading in a pot mill at room temperature for 1 hour.

EXAMPLE 5

Sorbitol and m-chlorobenzaldehyde were reacted in the same manner as in Example 1, except that the solvent mixture of cyclohexane and n-butanol was used, to produce a condensation product.

A solution of 0.5 part of the above condensation product in 50 parts of toluene, 10 parts of copolymer of vinyl chloride and vinyl acetate at the ratio of 87 : 13, 4 parts of dioctyl phthalate, 20 parts of acetone and 25 parts of ethyl acetate were mixed and kneaded to obtain a uniform mixture. 10.5 parts of titanium white was added to 94.5 parts of the resultant mixture, followed by mixing with three rolls for 1 hour.

EXAMPLE 6

To a mixture of 20 parts of dibutyl phthalate and 100 parts of 40 wt.% vinyl acetate emulsion was added 0.7 part of the same condensation product as Example 1, and the resultant mixture was kneaded with three rolls at room temperature for 1 hour.

The viscosity, thixotropic index and other physical properties of the paint compositions were determined with the results given in Table 1 below.

Table 1

| No. | Paint composition | Amount of condensation product used (wt.%) | Viscosity (cps.) | Thixotropic index | Transparency | Running Length (mm) | Running Film thickness * ($\mu$) |
|---|---|---|---|---|---|---|---|
| 1 | Example 1 | 0 | 300 | 1.0 | Excellent | >20 | 100 |
|   |           | 0.5 | 1000 | 3.0 | " | 0 | 100 |
|   |           | 0 | 200 | 1.0 | — | >20 | 700 |
| 2 | Example 2 | 3.0 | 2000 | 2.8 | — | 0 | 700 |
|   |           | 0 | 300 | 1.0 | Excellent | >20 | 200 |
| 3 | Example 3 | 5.0 | 5800 | 1.4 | " | 0 | 250 |
|   |           | 0 | 150 | 1.0 | Excellent | >20 | 70 |
| 4 | Example 4 | 0.2 | 1300 | 2.5 | " | 1< | 150 |
|   |           | 0 | 150 | 1.0 | — | >20 | 150 |
| 5 | Example 5 | 0.3 | 1500 | 2.5 | — | 0 | 150 |
|   |           | 0 | 180 | 1.0 | — | — | 300 |
| 6 | Example 6 | 1.0 | 2000 | 2.6 | — | — | " |

Note: * Thickness of film free of running at 90°C.

The viscosity, thixotropic index and other physical properties were determined as follows.

Viscosity: Measured by a Brookfield viscometer at 25°C.

Thixotropic index: Measured by JIS K 6901 at 25°C.
Transparency: Measured by naked eyes
Running: The paint composition was applied to a base glass material, which was immediately positioned with a gradient at an angle of 25°, and left for 30 minutes at 80°C, whereupon the length of the resulting flow and the resulting film thickness were measured.

titanium white placed placidly on it surface, and left to stand for a week, whereupon the volume of colored portion was measured.
Glass: JIS K 5400 (by luster meter, at 60°).

Table 2

| Thixotropy imparting agent | Amount used (relative to amount of resin) | Viscosity (cps/6r.p.m.) | Sagging (mm) 100 μ | Sagging (mm) 70 μ | Amount of pigment deposited (cc/500 cc) | Gloss |
| --- | --- | --- | --- | --- | --- | --- |
| | 0.001 | 160 | sagged | 7.0 | 260 | 88 |
| | 0.04 | 190 | 6.1 | 0.1 | 260 | 88 |
| | 0.1 | 300 | 2.0 | 0 | 260 | 88 |
| | 0.2 | 395 | 1.0 | 0 | 280 | 88 |
| Dibenzylide sorbitol | 0.4 | 425 | 0 | 0 | 430 | 85 |
| | 0.6 | 435 | 0 | 0 | 490 | 86 |
| | 0.8 | 535 | 0 | 0 | 498 | 85 |
| | 1.0 | 650 | 0 | 0 | 500 | 80 |
| | 2.0 | 1580 | 0 | 0 | 500 | 80 |
| | 0.06 | 220 | 3.9 | 0.1 | 480 | 88 |
| Di-isopropylbenzilidene solvitol | 0.8 | 485 | 0.2 | 0 | 480 | 84 |
| | 1.6 | 1030 | 0 | 0 | 500 | 81 |
| Dinaphthyl sorbitol | 0.4 | 280 | 5.0 | 2.0 | 300 | 86 |
| | 1.0 | 485 | 0 | 0 | 465 | 81 |
| | 0.2 | 300 | 12.0 | 1.0 | 210 | 81 |
| Organic bentonite | 0.4 | 390 | 6.0 | — | 260 | 77 |
| | 0.6 | 425 | 4.3 | — | 298 | 77 |
| | 0.8 | 495 | 3.7 | — | 310 | 75 |
| | 1.0 | 680 | 0 | — | 450 | 70 |
| | 0.2 | 230 | 16.8 | — | 230 | 73 |
| | 0.4 | 230 | 11.3 | — | 210 | — |
| Finely divided silica | 0.6 | 340 | 10.5 | — | 245 | — |
| | 0.8 | 375 | 6.3 | — | 245 | — |
| | 1.0 | 375 | 7.0 | — | 280 | — |
| Aluminum stearate | 0.2 | 225 | 10.3 | — | 230 | 74 |
| | 0.4 | 225 | 10.1 | — | 230 | — |
| | 0.6 | 265 | 10.7 | — | 255 | — |
| | 0.8 | 275 | 9.8 | — | 250 | — |
| Aluminum stearate | 1.0 | 280 | 7.8 | — | 280 | — |
| None | — | 150 | 20 | — | Totally deposited | 88 |

EXAMPLE 7

| | |
| --- | --- |
| Alkyd resin | 50 parts |
| Mineral turpentine | 70 parts |
| Zinc Oxide | 8 parts |
| Calcium carbonate | 15 parts |
| Drying agent | 0.5 parts |
| Xylene | 2.0 parts |

To the mixture containing the above components was added a gel prepared by dissolving a specified amount of thixotropy inparting agent in 4.0 parts of methyl cellosolve with heating. The mixture was fully kneaded for 6 hours. In this way various coating composition were prepared.

The viscosity and other physical properties were determined as follow.

The viscosity: same as Example 1.
Sagging: The paint composition was applied to a base glass material in a predetermined thickness, which was immediately positioned vertically and left to stand for 10 minutes, whereupon the length of the resulting flow was measured.
Amount of pigment deposited: The paint composition was charged into a 500 cc messcylinder, with 19 parts

EXAMPLE 8

A mixture of 16 parts of nitrocellulose (5.8 sec.), 6 parts of dioctyl phthalate, 0.1 part of addition product of di-p-methylbenzylidene sorbitol with 2.5 parts of ethylene oxide, 16.0 parts of crude castor oil, 13.4 parts of methyl ethyl ketone, 16.8 parts of diisobutyl ketone, 9.6 parts of butanol and 19.7 parts of xylene were mixed together and heated to 50°C. 100 parts of water was added slowly dropwise to 250 parts of the lacquer thus obtained with vigorous agitation at 50°C to prepare a uniform emulsion, which was found to be of a viscosity of 350 cps./6 r.p.m. as measured by Brookfield viscometer at spindle rotational speed of 6 r.p.m./min. The emulsion lacquer could be applied to the surface of porous porcelain without causing interior impregnation.

EXAMPLE 9

To a mixture of 44.0 parts of nitrocellulose and 43.0 parts of alkyd resin was added a gel prepared by dissolving 0.2 parts of thixotropy imparting agent in 12.8 parts of dibutylphthalate with heating and cooling the solution obtained. The resulting mixture was placed in a pot mill along with 80 parts of methyl ethyl ketone, 10 parts of iso-propanol and 5 parts of ethanol, and the mixture was fully kneaded for 6 hours to prepared a paint composition. 100 parts of the paint composition was mixed with 100 parts of "Freon 12" to obtain an aerosol lacquer.

The viscosity and sagging of the paint composition were determined by the same method as Example 1 or 2. Viscosity was 700 cps/6 r.p.m. and sagging was 0 (at 70 μ).

What we claim is:

1. In a method of making a thickened coating composition containing a film forming binder composition selected from the group consisting of tar epoxy, alkyd and modified alkyd resin binder compositions by adding a thickening agent to said binder composition, the improvement which comprises adding to said binder composition from about 0.001% to about 10% by weight of a thickening agent consisting essentially of a condensation product of 1 to 3 moles of a polyhydric alcohol selected from the group consisting of Xylitol, sorbitol and heptitol, and 1 mole of aromatic monoaldehyde selected from the group consisting of benzaldehyde, methyl benzaldehyde, nitrobenzaldehyde, aminobenzaldehyde, naphthylaldehyde, isopropylbenzaldehyde, methylnaphthylaldehyde, nitronaphthylaldehyde, aminonaphthylaldehyde, halogen substituted napthyladehyde, and halogen substituted benzylaldehyde.

2. The improved method according to claim 1, wherein said aromatic monoaldehyde is benzaldehyde.

3. The improved method according to claim 1, wherein said polyhydric alcohol is sorbitol.

4. The improved method according to claim 1, wherein said polyhydric alcohol is Xylitol.

5. The improved method according to claim 1, wherein said condensation product is a member selected from the group consisting of benzylidene sorbitol, nitrobenzylidene sorbitol, amino benzylidene sorbitol, methyl benzylidene sorbitol, benzylidene xylitol, nitrobenzylidene xylitol, aminobenzylidene Xylitol, and methyl benzylidene Xylitol.

6. The improved method according to claim 1, wherein from about 0.3% to about 10% by weight of said condensation product is added to tar epoxy binder composition.

7. The improved method according to claim 1, wherein said polyhydric alcohol comprises D-Xylitol.

8. Improved paint composition comprising a film-forming binder selected from the group consisting of tar epoxy, alkyd and modified alkyd resins and from 0.001 to 10% by weight as a thixotropically effective amount of a condensation product of 1 to 3 moles of a polyhydric alcohol selected from the group consisting of Xylitol, sorbitol, and heptitol, and 1 mole of an aromatic monoaldehyde, said percent by weight being based upon the weight of said film-forming binder, said aromatic monoaldehyde being at least one member selected from the group of benzaldehyde, isopropyl benzylaldehyde, methylbenzaldehyde, nitrobenzaldehyde, aminobenzaldehyde, napthylaldehyde, methyl naphthyladehyde, nitronaphthylaldehyde and aminonapthylaldehyde, halogen substituted benzaldehyde and halogen substituted napthylaldehyde.

9. The paint composition according to claim 8, in which said aromatic monoaldehyde is benzaldehyde.

10. The paint composition according to claim 8, in which polyhydric alcohol is at least one of either sorbitol or Xylitol.

11. The paint composition according to claim 8, in which said polyhydric alcohol is at least one species of either D-mannitol, D-talitol, D-iditol, D-galactitol or D-Xylitol.

12. The paint composition according to claim 8, in which said condensation product is selected from the group consisting of benzylidene sorbitol, nitrobenzylidene sorbitol, aminobenzylidene sorbitol, lower alkylbenzylidene sorbitol, benzylidene Xylitol, nitrobenzylidene Xylitol, aminobenzylidene Xylitol and lower alkylbenzylidene Xylitol.

13. The paint composition according to claim 8, in which said condensation product is contained in the proportion of 0.005 to 0.5% by weight.

14. The paint composition according to claim 8, in which said film-forming binder is tar-epoxy.

* * * * *